US008020085B2

(12) United States Patent
Dietz et al.

(10) Patent No.: US 8,020,085 B2
(45) Date of Patent: Sep. 13, 2011

(54) ASSIGNING PRIORITY LEVELS TO HYPERLINKS EMBEDDED IN THE CREATED WEB DOCUMENTS

(75) Inventors: Timothy Alan Dietz, Austin, TX (US); Walid M. Kobrosly, Round Rock, TX (US); Nadeem Malik, Austin, TX (US); Avijit Saha, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 2547 days.

(21) Appl. No.: 10/713,726

(22) Filed: Nov. 13, 2003

(65) Prior Publication Data

US 2005/0108350 A1 May 19, 2005

(51) Int. Cl.
*G06F 17/00* (2006.01)
(52) U.S. Cl. .......................... 715/206; 707/748; 707/752
(58) Field of Classification Search ................... 709/207
See application file for complete search history.

(56) References Cited

U.S. PATENT DOCUMENTS

| | | | | |
|---|---|---|---|---|
| 5,835,712 A * | 11/1998 | DuFresne | ...... | 709/203 |
| 5,958,008 A * | 9/1999 | Pogrebisky et al. | ......... | 709/223 |
| 2002/0010715 A1* | 1/2002 | Chinn et al. | .................. | 707/514 |
| 2003/0074350 A1* | 4/2003 | Tsuda | ............................... | 707/3 |
| 2003/0208578 A1* | 11/2003 | Taraborelli et al. | ........... | 709/223 |
| 2004/0250241 A1* | 12/2004 | O'Neil et al. | ................ | 717/118 |

* cited by examiner

*Primary Examiner* — Tim T. Vo
*Assistant Examiner* — Aaron Sanders
(74) *Attorney, Agent, or Firm* — J. B. Kraft; Steven L. Bennett

(57) ABSTRACT

The creator or author of the Web document or page at the Web site source of the page is enabled to prioritize all of the hyperlinks to other Web documents embedded in the Web page in order to optimize the needs such as the business needs of the host. The prioritization is applied in the determination of the order in which the Web documents linked to the activated embedded hyperlinks in the Web document are to be accessed. The system is implemented through the inclusion of a hypertext markup language tag associated with each of the prioritized hyperlinks indicative of the priority level of the associated hyperlink. The implementation for designating a priority level for each of the hyperlinks may be enabled to change any previously designated priority levels for said hyperlinks. Such changes in any previously designated priority levels could be made applicable to the priority levels in previously distributed copies of said Web document.

19 Claims, 4 Drawing Sheets

ASSIGNING PRIORITY LEVELS TO HYPERLINKS EMBEDDED IN THE CREATED WEB DOCUMENTS

TECHNICAL FIELD

The present invention relates to computer managed communication networks, such as the World Wide Web (Web) and, particularly, to systems for controlling Web traffic in transmitted Web documents or pages so as to optimize Web throughput for the hosts or owners of Web sites creating and distributing hypertext Web documents.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct links between pages and other documentation on the Web and a variety of related data sources that were at first text and images, e.g. both JPEG and MPEG, and then evolved into media, i.e. "hypermedia". Web documents may also include applets and other programming routines. (The term Web documents as used herein is meant to include all such data documents). This even further exploded the use of the Internet or Web.

A major problem encountered by all Web users and hosts of Web documents source sites is the amount of wasted time that the user spends in misdirection, or in waiting that the user often encounters in trying to get to an appropriate Web site or Web document. This is especially true in the case of electronic business conducted via the Web wherein the owners or hosts of the Web source sites provide the Web documents. These hosts or owners offering products or services are, of course, interested in completing business transactions as soon as possible so as to maximize their revenue and business throughout. Thus, it is clearly in the interest of all businesses and organizations that host Web source sites to have their customers and clients reach their intended destinations on the Web pages suitable to their business as soon as possible.

However, in addition to purchasers and customers, there are consumers and others who may not have an immediate business need for products and services but who are nonetheless of interest to the business organization. Such clientele may wish general information about the business organization that could engender goodwill and even future revenue. Lastly, there may be a great many users just browsing around the Web without real business interest. Unfortunately, the current state of the Web document distribution art does not offer the host creating the Web any device through which the real revenue producing business customers may have a quick path to Web documents satisfying their needs. It appears that casual browsing requests compete on an equal footing with solid business product purchase requests insofar as Web page access and transmission resources are concerned. During high volume traffic on the Web and to Web source sites, activity by casual browsers may significantly slow down real revenue producing business requests, even to the point that the purchaser interest is lost and he goes elsewhere.

SUMMARY OF THE PRESENT INVENTION

The present invention provides a system, method and program enabling the host, e.g. the creator or author of the Web document or page at the Web site source of the page, to prioritize all of the hyperlinks to other Web documents embedded in the Web page in order to optimize the needs, such as the business needs of the host. In other words, a hyperlink most likely to produce a sale would be given the highest priority while a hyperlink connected to institutional or goodwill information would be given a lower priority. The system also includes means for applying the prioritization in the determination of the order in which the Web documents linked to the activated embedded hyperlinks in the Web document are to be accessed.

The system is most effective when the Web document or page source site is made up of a network comprising a plurality of the source sites from which said Web documents linked to said prioritized hyperlinks are accessed and a service manager server system controls the access of Web documents linked to the prioritized hyperlinks, wherein the means for applying said prioritization are at the service manager server system. The invention may be conveniently implemented through the inclusion of a HTML tag associated with each of said prioritized hyperlinks indicative of the priority level of the associated hyperlink. The means for designating a priority level for each of the hyperlinks may be enabled to change any previously designated priority levels for said hyperlinks. Such changes in any previously designated priority levels could be made applicable to the priority levels in previously distributed copies of said Web document.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Before going further into the details of specific embodiments, it will be helpful to understand from a more general perspective the various elements and methods that may be related to the present invention. Since the major aspect of the present invention is directed to Web pages transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the text, *Internet: The Complete Reference, Millennium Edition*, Margaret Young et al., Osborne/McGraw-Hill, Berkeley, Calif., 1999. Any data communication system that interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers.

Web documents are conventionally implemented in HTML language, which is described in detail in the text entitled *Just Java*, van der Linden, 1997, SunSoft Press, particularly at Chapter 7, pp. 249-268, dealing with the handling of Web pages; and also in the above-referenced *Mastering the Internet*, particularly pp. 637-642, on HTML in the formation of Web pages.

Figure 1:
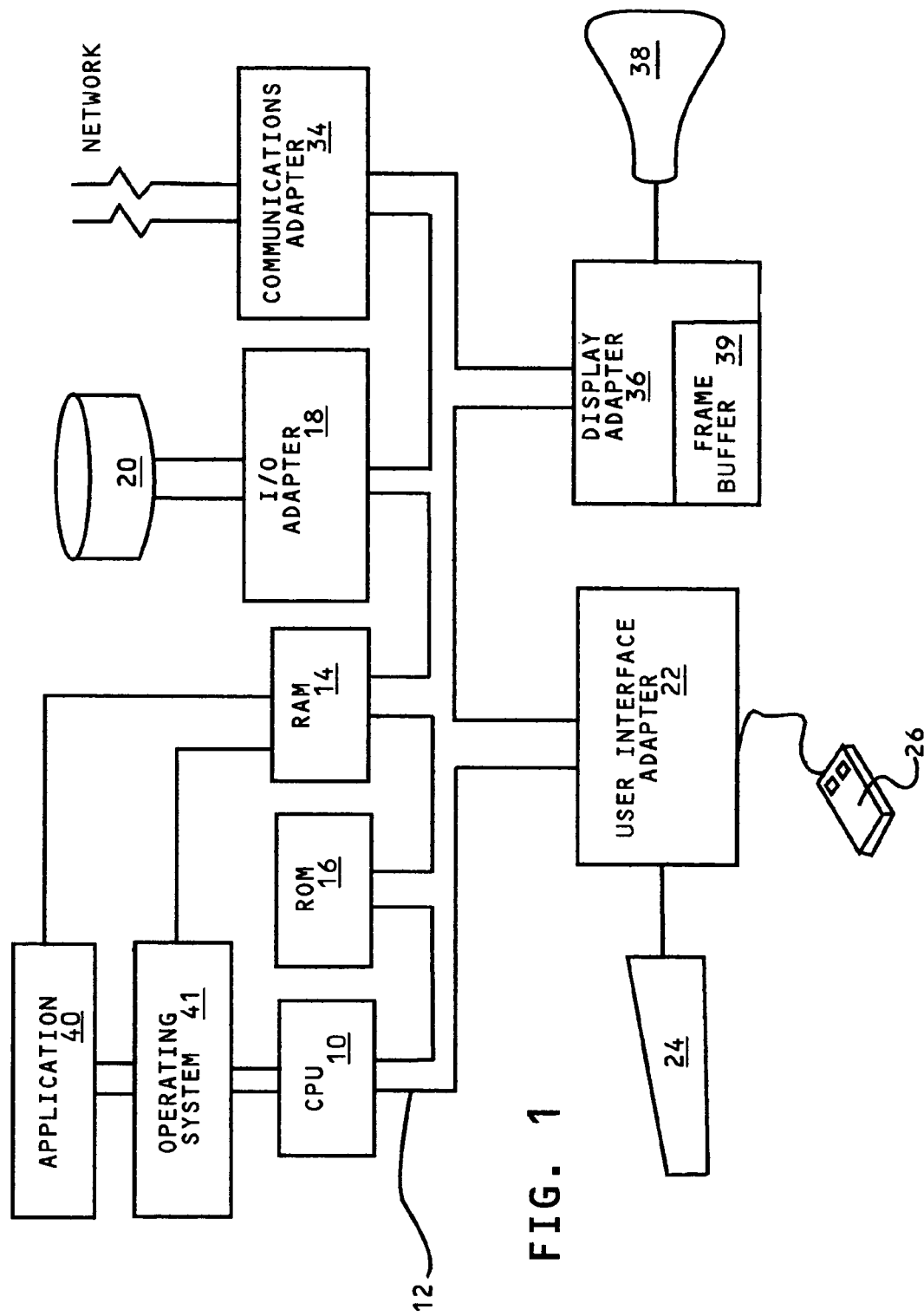
FIG. 1 is a block diagram of a data processing system including a central processing unit and network connections via a communications adapter that is capable of functioning both as a display computer for a receiving Web station, as well as the servers at the Web source sites on which the Web pages of the present invention with prioritized hyperlinks are created.

Referring now to FIG. 1, there is provided a data processing system that may function as the host Web source site server on which the Web documents or pages used in the present invention are created. Copies of the source Web documents are distributed via the Web. The data processing system may also function as the receiving display terminals on the Web through which the Web documents are presented to requesting users.

A central processing unit (CPU) 10, such as one of the PC microprocessors or workstations, e.g. RISC SYSTEM/6000™ series available from INTERNATIONAL BUSINESS MACHINE CORPORATION (IBM), or DELL PC microprocessors, is provided and interconnected to various other components by system bus 12. An operating system 41 runs on CPU 10, provides control and is used to coordinate the function of the various components of FIG. 1. Operating system 41 may be one of the commercially available operating systems such as IBM's AIX 6000™ operating system or MICROSOFT'S WINDOWS 98™ or WINDOWS NT™, as well as UNIX and other IBM AIX operating systems. Application programs 40, controlled by the system, are moved into and out of the main memory Random Access Memory (RAM) 14. These programs include the programs of the present invention that will be described hereinafter. Conventional Web browsers, at the receiving Web stations, such as Netscape 3.0™ or Microsoft's Internet Explorer™, operate to access and display the Web documents at the receiving terminal, as will be hereinafter described.

When the data processing system functions as the Web source site server, then the program routines in applications 40 would be the programs involved in the prioritizing of the embedded hyperlinks in Web documents being created. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the host creating Web pages may interactively relate to the programs for prioritizing the hyperlinks embedded in the Web document according to the present invention. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods that may be related to the present invention. Since a major aspect of the present invention is directed to documents, such as Web pages, transmitted over networks, an understanding of networks and their operating principles would be helpful. We will not go into great detail in describing the networks to which the present invention is applicable. Reference has also been made to the applicability of the present invention to a global network such as the Internet or Web. For details on Internet nodes, objects and links, reference is made to the text, *Mastering the Internet*, G. H. Cady et al., published by Sybex Inc., Alameda, Calif., 1996.

The Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics and other images. This displayable information may be still, in motion or animated, e.g. animated GIF images.

Figure 2:
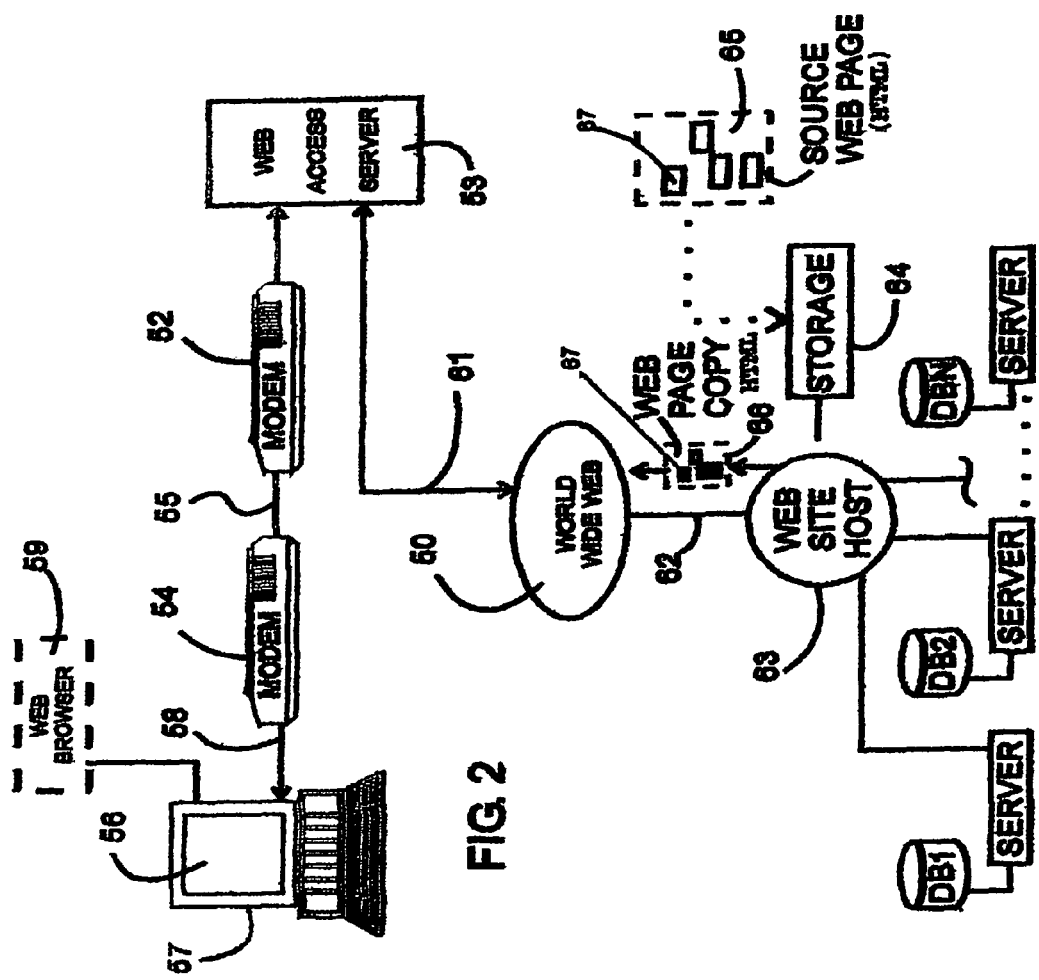
FIG. 2 is a generalized diagrammatic illustration of a Web portion showing how the prioritized Web documents of the present invention may be created and distributed over the Web and how activated prioritized hyperlink document accessing is handled at the Web source site.

Web documents are conventionally implemented in HTML language, which is described in detail in the text entitled *Just Java*, van der Linden, 1997, SunSoft Press, particularly at Chapter 7, pp. 249-268, dealing with the handling of Web pages; and also in the above-referenced *Mastering the Internet*, particularly at pp. 637-642, on HTML in the formation of Web pages. The images on the Web pages are implemented in a variety of image or graphic files such MPEG, JPEG or GIF files, which are described in the text, *Internet: The Complete Reference, Millennium Edition*, Young et al., 1999, Osborne/McGraw-Hill, particularly at pp. 728-730. A generalized diagram of a portion of the Web, which the computer controlled display terminal 57 used for Web page receiving during searching or browsing, is connected as shown in FIG. 2. Computer display terminal 57 may be implemented by the computer system set up in FIG. 1 and connection 58 (FIG. 2) is the network connection shown in FIG. 1. For purposes of the present embodiment, computer 57 serves as a Web display station and has received displayed Web page 56, which contains embedded hyperlinks to other Web pages.

Reference may be made to the above-mentioned *Mastering the Internet*, pp. 136-147, for typical connections between local display stations to the Web via network servers, any of which may be used to implement the system on which this invention is used. The system embodiment of FIG. 2 has a host-dial connection. Such host-dial connections have been in use for over 30 years through network access servers 53 that are linked 61 to the Web 50. The Web servers 53, which also may have the computer structure described with respect to FIG. 1, may be maintained by an Internet Service Provider (ISP) to the client's display terminal 57. The Web server 53 is accessed by the client terminal 57 through a normal dial-up telephone linkage 58 via modem 54, telephone line 55 and modem 52. Presently available high speed cable modems, as well as a variety of conventional wireless connections may also be used to access the Web. The HTML file representative of the Web page 56 has been downloaded to display terminal 57 through Web access server 53 via the telephone line linkages from server 53 that may have accessed them from the Internet 50 via linkage 61. The Web browser program 59 operates within the display terminals 57 to control the communication with the Web access server 53 to thereby download and display the accessed Web pages 56 on terminal 57.

The Web documents of the present invention are created at Web source site 69 under the control of the Web site host server system 63. A detailed illustration of such a site may be found in copending commonly assigned U.S. patent application, WEB SITE MANAGEMENT IN A WORLD WIDE WEB COMMUNICATION NETWORK THROUGH REASSIGNMENT OF THE SERVER COMPUTERS DESIGNATED FOR RESPECTIVE WEB DOCUMENTS BASED UPON USER HIT RATES FOR THE DOCUMENTS, Carroll, Ser. No. 09/506,237, filed Feb. 17, 2000. As will hereinafter be described in greater detail, the Web documents that will be referred to as Web pages are created at the Web site host server system 63 and the source Web pages, shown diagrammatically in outline 65, are stored in associated storage facility 64. In this example, the Web site will be one maintained by a business organization for communications and sales to the public over the Web. There are several sources maintained at the site: DB1, DB2 . . . (through) . . . DBn with associated servers maintained at the site. It is at these individual DB sources that the Web pages linked to hyperlinks 67 in the basic Web pages are stored. Accordingly, when the basic or source Web page is created at Web site host 63 the hyperlinks 67 therein have associated priority tags indicating a priority level. Thus, when copies 66 of the Web page are distributed to the Web 60 via connection 62, the priority tags will remain in association with hyperlinks 67 in transmitted copy 66. As will hereinafter be detailed with respect to the program description, the host assigns priorities to the embedded links based upon the desired optimization of site operations. For example, in a corporation site, if the pages in DB1 were related to customer sales; in DB2 were related to finding telephone numbers of sales and technical people; and in DBn were related to general institutional data on the corporation, then the priorities would be expected to run DB1, DB2, DBn (highest to lowest.)

Figure 3:
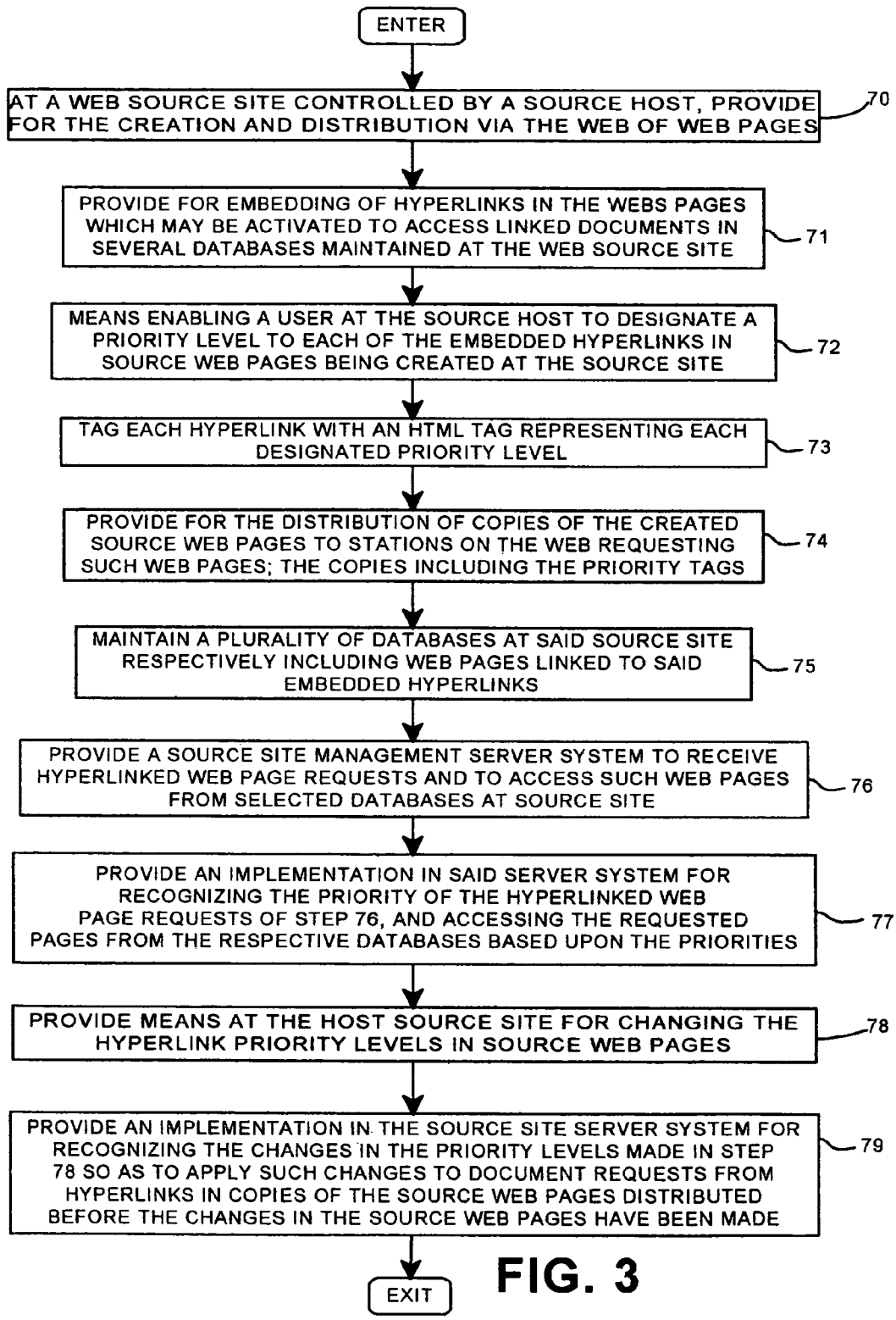
FIG. 3 is an illustrative flowchart describing the setting up of the elements of a program according to the present invention for creating and using Web documents with prioritized hyperlinks to access Web documents linked to the hyperlinks.

FIG. 3 is a flowchart showing the development of a process according to the present invention for creation of Web pages with prioritized hyperlinks. The programming functions in the process of FIG. 3 have already been described in general with respect to FIG. 2. At a Web source site controlled by a host, provision is available for the creation and distribution of Web pages, step 70. Provision is made for the conventional embedding of hyperlinks in the pages that may be activated to access linked documents maintained in the several databases at this Web source site, step 71. Means are provided at the source host server to designate a priority level to each of the embedded hyperlinks in source Web pages being maintained at the source site, step 72. Each hyperlink may be tagged with an HTML tag representing its priority level, step 73. Provision is made for the distribution of copies of the source Web pages to stations on the Web requesting such pages. The copies distributed contain such priority tags, step 74. The Web source site maintains a conventional set of served databases each including Web pages linked to the embedded hyperlinks, step 75. A source management server system is also provided for receiving Web page requests via activated hyperlinks in the distributed prioritized Web page copies, step 76. The source site server system is set up to recognize priority levels associated with the activated hyperlinks in step 76, so as to order the accessing of the linked Web documents based upon such priorities, step 77.

In addition, means are provided at the host server of the Web site source for changing the priority levels in the source Web pages stored at the source site, step 78. With such changes in the priority levels, an implementation is provided at the host server system for recognizing and tracking any such changes in priority levels made in step 78 so that such changes may be applied to Web page requests resulting from hyperlinks in copies of the Source Web pages distributed before changes in the source Web pages have been made, step 79.

Figure 4:
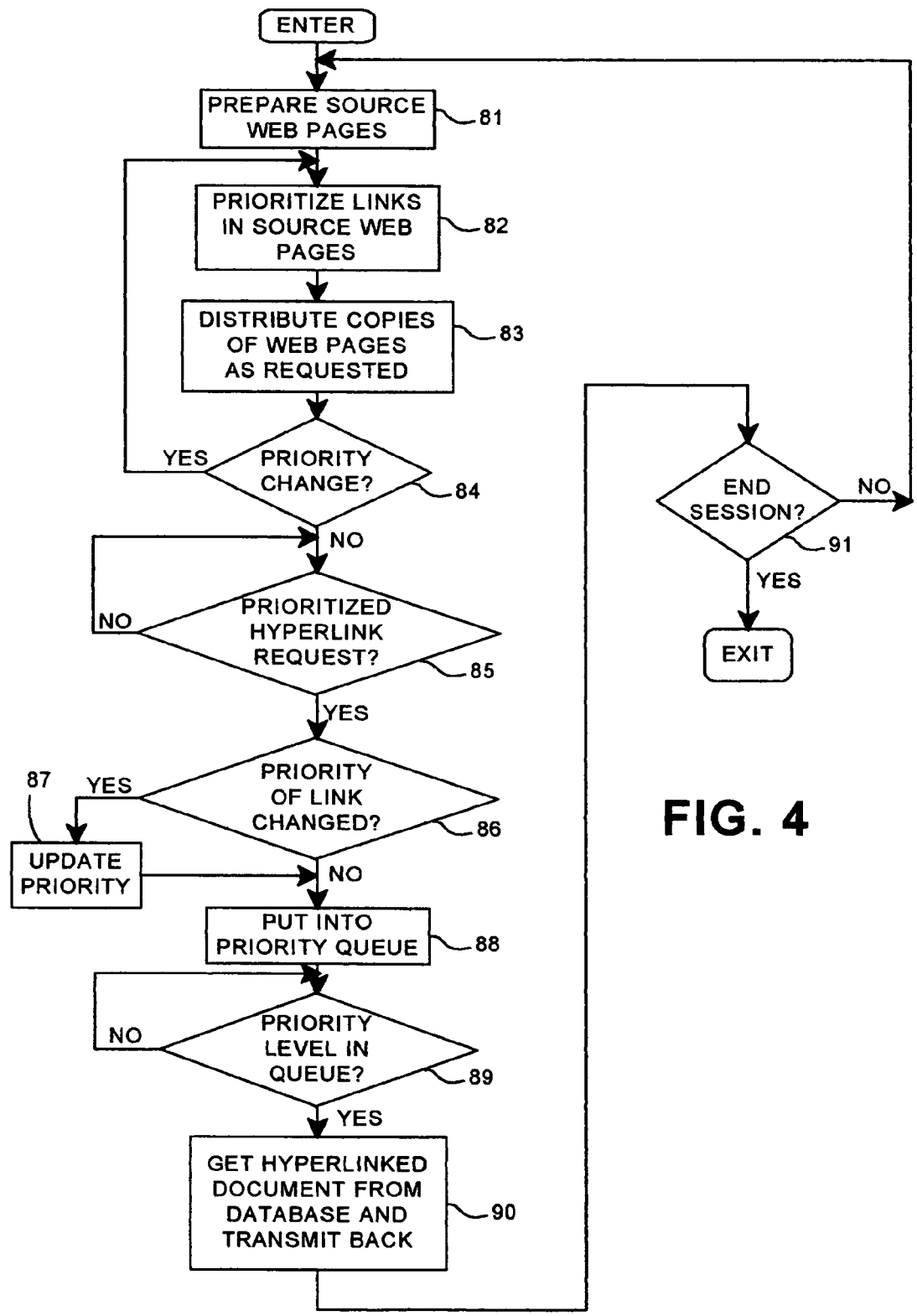
FIG. 4 is a flowchart of an illustrative run of the program set up in FIG. 3.

The running of the process set up in FIG. 3 and described in connection with FIG. 2 will now be described with respect to the flowchart of FIG. 4. A conventional source Web page is prepared, step 81, and its hyperlinks are prioritized according to the present invention, step 82. These source Web pages are stored at the site and copies of the pages are distributed as requested over the Web. Periodic determinations are made as to any changes in the priority levels that the host may have chosen to make to the hyperlinks in the stored source Web pages, e.g. based upon changing business conditions, step 84. If Yes, then the process is branched back to step 82 where the changes are implemented. If No, then a request from a prioritized hyperlink into a distributed Web page is awaited, step 85. If Yes, there is such a request, then, step 86, a further determination is made as to whether there has been an interim change in the priority level of the hyperlink. If Yes, that priority level is updated, step 87. Next, the request is placed in a appropriate queue and position, step 88, based upon the priority. Next, step 89, when the priority point in the queue is reached, the linked Web page is accessed from the appropriate database and transmitted back to the requesting Web station, step 90. At this point, a determination may conveniently be made as to whether the session is at an end, step 91. If Yes, the session is exited. If No, the process is branched back to initial step 81.

Although certain preferred embodiments have been shown and described, it will be understood that many changes and modifications may be made therein without departing from the scope and intent of the appended claims.

What is claimed is:

1. In a World Wide Web (Web) communication network with user access via a plurality of data processor controlled interactive receiving display stations for displaying received hypertext Web documents, transmitted from source sites on the Web, including at least one display page containing text, images and a plurality of embedded hyperlinks, each hyperlink being user activatable to access and display a respective linked hypertext Web document from source sites on the Web, a system for controlling access activity from activated hyperlinks and their respective Web document source sites comprising:

means at said source sites for prioritizing said plurality of embedded hyperlinks in a Web document; and means for applying said prioritization in the determination of the order in which the Web documents linked to the activated embedded hyperlinks in said Web document are to be accessed.

2. The Web communication network of claim 1 further including:
   a document source site network comprising:
      a plurality of the source sites from which said Web documents linked to said prioritized hyperlinks are accessed; and
      a service manager server system for accessing Web documents linked to said prioritized hyperlinks;
   wherein said means for applying said prioritization is at said service manager server system.

3. The Web communication network of claim 1 wherein said each of said Web documents further includes a hypertext markup language tag associated with each of said prioritized hyperlinks indicative of the priority level of the associated hyperlink.

4. The Web communication network of claim 3 further including means associated with a source site of a Web document enabling an interactive user at the source Web site to designate a priority level for each of the hyperlinks.

5. The Web communication network of claim 4 wherein said means for designating a priority level for each of said hyperlinks are enabled to change any previously designated priority levels for said hyperlinks.

6. The Web communication network of claim 5 wherein said changes in any previously designated priority levels are applicable to the priority levels in previously distributed copies of said Web document.

7. In a World Wide Web (Web) communication network with. user access via a plurality of data processor controlled interactive receiving display stations for displaying received hypertext Web documents, transmitted from source sites on the Web, including at least one display page containing text, images and a plurality of embedded hyperlinks, each hyperlink being user activatable to access and display a respective linked hypertext Web document from source sites on the Web, a method for controlling access activity from activated hyperlinks and their respective Web document source sites comprising:
   prioritizing said plurality of embedded hyperlinks in a source Web document at a source site; and
   applying said prioritization in the determination of the order in which the Web documents linked to the activated embedded hyperlinks in said Web document are to be accessed.

8. The Web communication method of claim 7 further including the step of:
   inserting in each of said Web documents a plurality of hypertext markup language tags each associated with each of said prioritized hyperlinks and indicative of the priority level of the associated hyperlink.

9. The Web communication method of claim 8 further including the step of enabling an interactive user at the source site of a Web document to designate a priority level for each of the hyperlinks.

10. The Web communication method of claim 9 wherein said step of designating a priority level for each of said hyperlinks may be applied to change any previously designated priority levels for said hyperlinks.

11. The Web communication method of claim 10 wherein said step of changing any previously designated priority levels is applicable to change the priority levels in previously distributed copies of said Web document.

12. A source World Wide Web (Web) hypertext document at a source Web site including at least one display page containing text, images and a plurality of embedded hyperlinks, each hyperlink being user activatable to access and display a respective linked hypertext Web document from source sites on the Web further including:
   a hypertext markup language tag associated with each embedded hyperlink indicating the priority of each hyperlink in the determination of the order in which the Web documents linked to the activated embedded hyperlinks in said Web document are to be accessed.

13. The source Web document of claim 12 further including means for changing the priority indication in each of said tags.

14. The source Web document of claim 13 further including means for applying changes in any previously designated priority levels to the priority levels in previously distributed copies of said source Web document.

15. A computer useable non-transitory storage medium having a computer readable program stored thereon for controlling access activity from activated hyperlinks and their respective Web document source sites in a World Wide Web (Web) communication network with user access via a plurality of data processor controlled interactive receiving display stations for displaying received hypertext Web documents, transmitted from source sites on the Web, including at least one display page containing text, images and a plurality of embedded hyperlinks, each hyperlink being user activatable to access and display a respective linked hypertext Web document from source sites on the Web, wherein the computer readable program when executed on a computer causes the computer to:
   prioritize said plurality of embedded hyperlinks in a source Web document at a source site; and
   apply said prioritization in the determination of the order in which the Web documents linked to the activated embedded hyperlinks in said Web document are to be accessed.

16. The computer useable medium of claim 15, wherein the computer program further causes the computer to:
   insert in each of said Web documents a plurality of hypertext markup language tags each associated with each of said prioritized hyperlinks and indicative of the priority level of the associated hyperlink.

17. The computer useable medium of claim 16, wherein the computer program further causes the computer to enable an interactive user at the source site of a Web document to designate a priority level for each of the hyperlinks.

18. The computer useable medium of claim 17, wherein the computer program further causes the computer to enable said designating a priority level for each of said hyperlinks by changing any previously designated priority levels for said hyperlinks.

19. The computer useable medium of claim 17, wherein the computer program further causes the computer to change priority levels of previously designated priority levels so as to change the priority levels in previously distributed copies of said Web document.

\* \* \* \* \*